US009424555B2

(12) United States Patent
Chen et al.

(10) Patent No.: US 9,424,555 B2
(45) Date of Patent: Aug. 23, 2016

(54) VIRTUAL CONFERENCING SYSTEM

(71) Applicant: ShanDong GoerXon Precision Industry Co., Ltd., Shandong (CN)

(72) Inventors: En-Chieh Chen, Shandong (CN); Fu-Ping Shih, Shandong (CN)

(73) Assignee: GOERXON OPTICAL PRECISION INDUSTRY CO., LTD, Shandong (CN)

( * ) Notice: Subject to any disclaimer, the term of this patent is extended or adjusted under 35 U.S.C. 154(b) by 0 days.

(21) Appl. No.: 14/531,652

(22) Filed: Nov. 3, 2014

(65) Prior Publication Data

US 2015/0326827 A1   Nov. 12, 2015

(30) Foreign Application Priority Data

May 6, 2014   (TW) .............................. 103116048 A

(51) Int. Cl.
*H04N 7/14* (2006.01)
*G06Q 10/10* (2012.01)
*H04N 7/15* (2006.01)
*G06F 3/01* (2006.01)

(52) U.S. Cl.
CPC ............. *G06Q 10/101* (2013.01); *G06F 3/011* (2013.01); *H04N 7/157* (2013.01); *H04N 7/15* (2013.01)

(58) Field of Classification Search
CPC ................................ H04N 7/15; H04N 7/147
USPC ............ 348/14.01, 14.07, 14.08, 14.09, 135, 348/650, E13.023, E13.066, 121, 218.1
See application file for complete search history.

(56) References Cited

U.S. PATENT DOCUMENTS

2007/0186002 A1* 8/2007 Campbell .............. H04N 7/142
709/231
2012/0021806 A1* 1/2012 Maltz ...................... H04W 4/20
455/566

* cited by examiner

*Primary Examiner* — Yosef K Laekemariam
(74) *Attorney, Agent, or Firm* — Polsinelli PC

(57) ABSTRACT

The present invention provides a virtual conferencing system including a wearable information device to be worn by a user; an environmental information capturing device that captures environmental information; a virtual simulation device that receives the environmental information captured by the environmental information capturing device, calculates simulation conferencing scenes by an intelligence algorithm, and transmits the simulation conferencing scenes to the wearable information device as the user's feedbacks.

8 Claims, 2 Drawing Sheets

VIRTUAL CONFERENCING SYSTEM

CROSS-REFERENCE TO RELATED APPLICATION

The present application claims priority to Taiwanese Application No. 103116048, filed on May 6, 2014, the contents of which are expressly incorporated by reference herein.

BACKGROUND OF THE INVENTION

1. Field of the Invention

The present invention relates to virtual conferencing systems, and, more particularly, to a virtual conferencing system equipped with a wearable information device for display of virtual conferencing scenes.

2. Description of Related Art

To sync up with the trend of global commerce, various video solutions for enterprise collaboration and conferencing needs including video conferencing systems have been developed to allow groups to meet naturally over distance and enable more productive meetings and real-time decision making, and also comprise of personal systems that combine ease-of-use with standard definition communication to allow individuals and teams to interact across various environments.

The existing multiple conferencing apparatus typically consists of projectors, an image-capturing lens, an audio source capturing and broadcasting device, and a network device. For instance, a first user at one location may utilize the conferencing apparatus to hear the sounds and view the local contours of a second user at a different location; likewise and meanwhile, the second user may also employ similar apparatus to hear and view the other user and initiate conversations.

However, the conventional multiple conferencing apparatus are still unable to overcome the defects of narrow view angles and also require switch of screens for display of information which inevitably would cause some delay in the process. In particular, the screens projected by projectors at different locations require further divisions of scenes and thus are far from ideal for proceeding.

SUMMARY OF THE INVENTION

In view of the drawbacks associated with the prior techniques, the present invention proposes a video conferencing system that improves on the foregoing defects and provides users with better sensory experiences.

To achieve the above and other objectives, the video conferencing system according to the present invention includes a wearable information device to be worn by a user; an environmental information capturing device that captures environmental information; a virtual simulation device that receives the environmental information captured by the environmental information capturing device, calculates simulation conferencing scenes by an intelligence algorithm, and transmits the simulation conferencing scene to the wearable information device as the user's feedbacks.

In an embodiment, the wearable information device further includes an optical display unit that displays the simulation conferencing scenes in a full-angle mode or a partial-angle mode; and The environmental information capturing device further comprises an image-capturing unit, an audio source capturing unit, a posture capturing unit, a command capturing unit or a documentary data capturing unit.

In an embodiment, the image-capturing unit is a direct projector that captures an image of an object and provides the image to the virtual simulation device, to be transmitted to the wearable information device.

In an embodiment, the posture capturing unit is a somatosensory device that senses a posture of the user and generates user posture information to be transmitted to the virtual simulation device such that the virtual simulation device provides the virtual conferencing scenes to the wearable information device accordingly.

In an embodiment, the documentary data capturing unit is connected a PC, a laptop computer, a tablet computer or a smart phone to capture documentary data inputted by the user.

Compared to prior techniques, the virtual conferencing system according to the present invention employs collaborative operations of environmental information capturing device and a virtual simulation device to acquire virtual conferencing scenes that allow the wearable information device to provide virtual conferencing scenes for users' sensory experience and which can also avoid delays caused by defects encountered in conventional techniques.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

The following illustrative embodiments are provided to illustrate the disclosure of the present invention, these and other advantages and effects can be understood by persons skilled in the art after reading the disclosure of this specification. Note that the structures, proportions, sizes depicted in the accompanying figures merely serve to illustrate the disclosure of the specification to allow for comprehensive reading without a limitation to the implementation or applications of the present invention, and does not constitute any substantial technical meaning.

Figure 1:
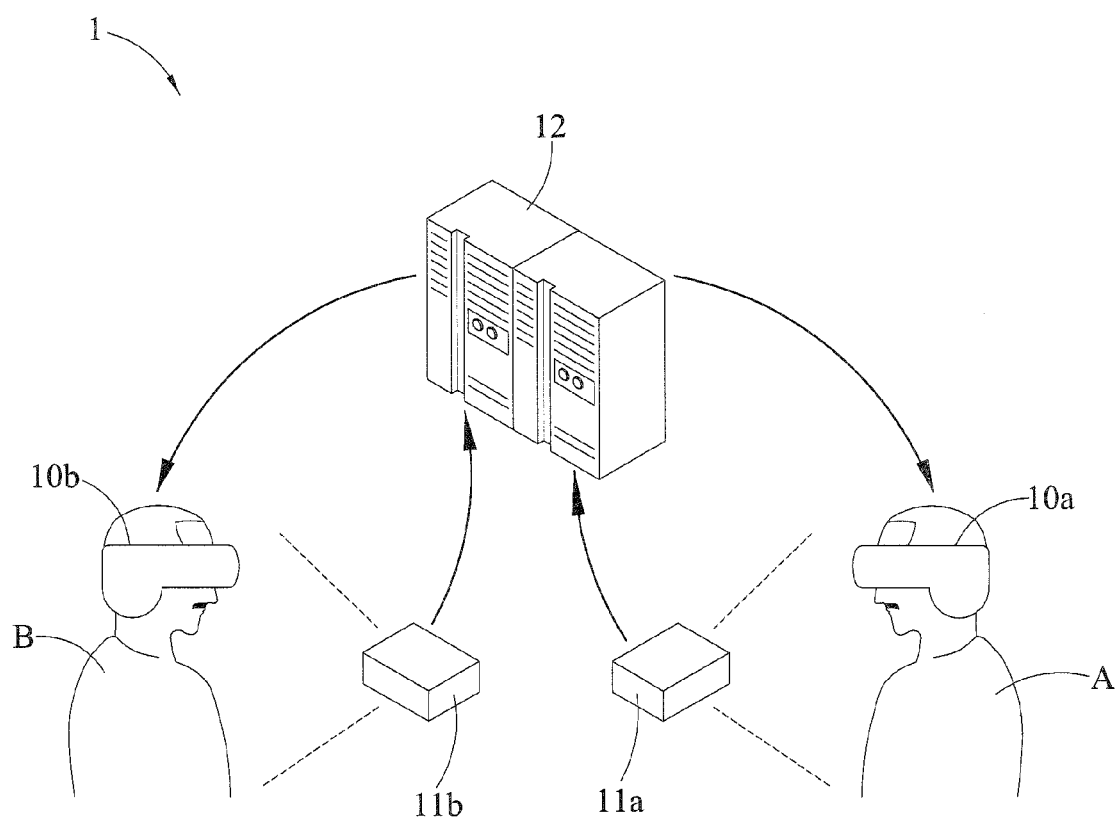
FIG. 1 is a schematic view of a virtual conferencing system according to the present invention.
Figure 2:
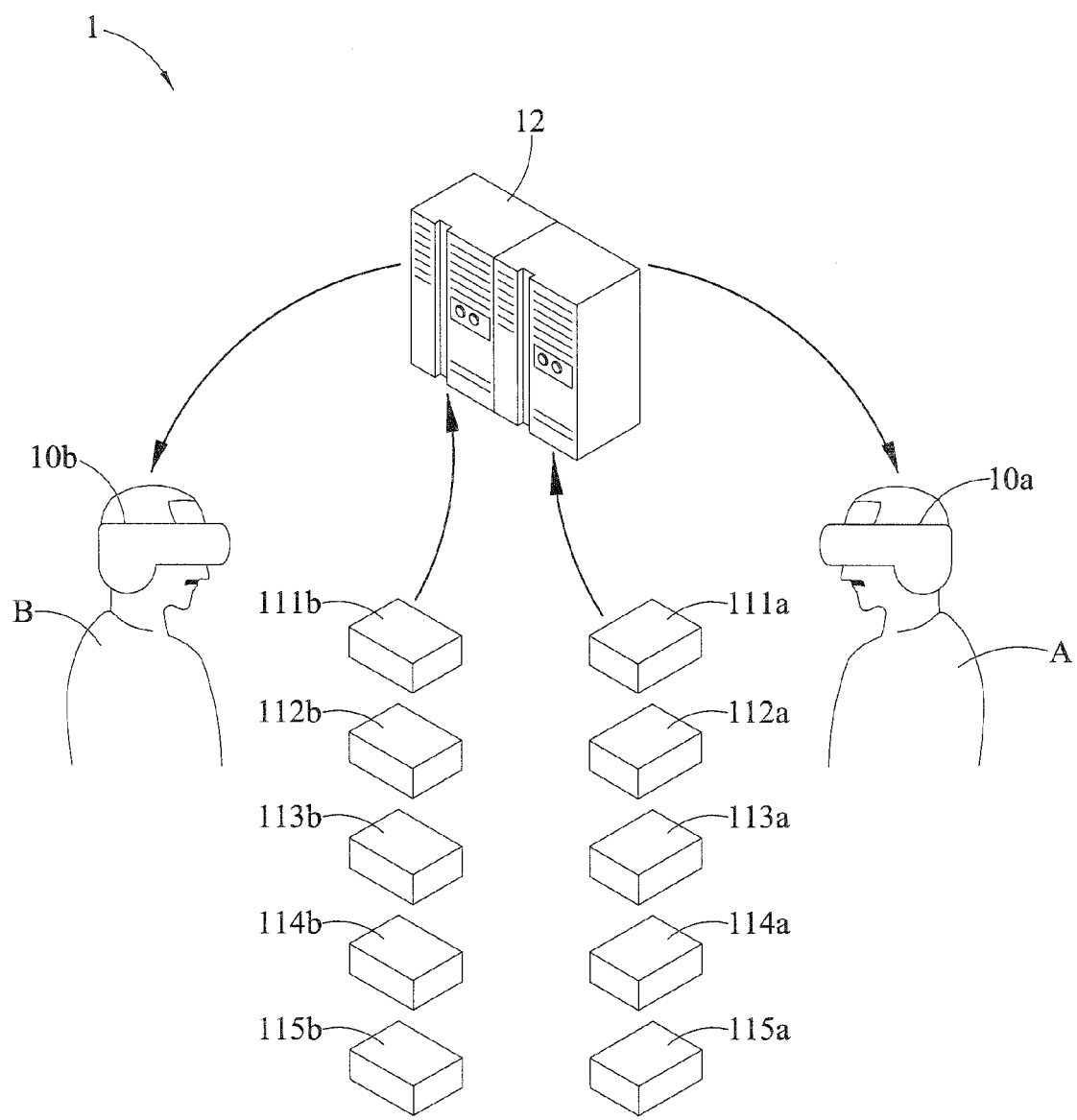
FIG. 2 is another schematic view of the virtual conferencing system according to the present invention.

Referring to the illustrations depicted in FIG. 1 and FIG. 2 in conjunction with the following descriptions. As shown, a virtual conferencing system 1 is equipped with wearable information devices 10a and 10b, environmental information capturing devices 11a and 11b, and a virtual simulation device 12.

Note that in actual implementations, the quantities of the wearable information devices 10a and 10b, the environmental information capturing devices 11a and 11b, and the virtual simulation device 12 can be flexibly adjusted as required. For instance, one single virtual simulation device may be employed in conjunction with more than one wearable information device and environmental information capturing device that are respectively configured at different locations as required.

The wearable information devices 10a and 10b are to be used by user A and user B, respectively. The environmental information devices 11a and 11b are adapted to capture all kinds of information about the surrounding environments. the virtual simulation device 12 is used to receive such environmental information captured by the environmental information devices 11a and 11b in order to calculate simulation conferencing scenes by an intelligence algorithm, and then transmit the simulation conferencing scenes to the wearable information devices 10a and 10b as user A's and user B's feedbacks.

In an embodiment, each of the wearable information devices 10a and 10b includes an optical display unit or an audio broadcasting device, wherein the optical display unit is capable of displaying virtual conferencing scenes received by the wearable information devices 10a and 10b in a full-angle mode or a partial-angle mode. Further, the wearable information devices 10a and 10b can be directly worn by the users A and B on their heads, respectively.

In an embodiment, the environmental information devices 11a and 11b respectively include image-capturing units 111a and 111b, audio source capturing units 112a and 112b, posture capturing units 113a and 113b, command capturing units 114a and 114b, or documentary data capturing units 115a and 115b. For instance, the environmental information devices 11a and 11b are capable of capturing information about user A and user B at different locations, capturing information about the users including conversations, capturing information about the users' postures and physical positions, and capturing all types of information about user commands expressed by the user verbal or physical communications. The posture-capturing devices 113a and 113b are a somatosensory device adapted to sense posture of user A and user B and transmit the posture information to the virtual simulation device 12, thereby allowing the virtual simulation device 12 to provide corresponding virtual conferencing scenes to the wearable information devices 10a and 10b according to the users' postures. In other words, the virtual conferencing scenes in the wearable information devices 10a and 10b may vary according to the movements of the users A and B. In an embodiment, the image-capturing units 111a and 111b are direct projectors that capture users' physical images for allowing the virtual simulation device 12 to transmit such images to the wearable information devices 10a and 10b. In an embodiment, the documentary data capturing units 115a and 11b may be connected to PCs, laptop computers, tablet computers or smart phones to capture all documentary data inputted by the user.

In an embodiment, the virtual simulation device 12 is a cloud server. After receiving all information acquired by the environmental information capturing devices 11a and 11b, the virtual simulation device 12 calculates simulation conferencing scenes according to a predetermined intelligence algorithm and further transmits the information about the conferencing scenes to the wearable information devices 10a and 10b, respectively, thereby allowing user A and user B to virtually share and experience the same simulation conferencing scenes by watching on the screen.

Furthermore, the virtual simulation device 12 is capable of calculating simulation conferencing scenes including both locations of user A and user B according to a predetermined intelligence algorithm. For instance, the wearable information devices 10a and 10b, the environmental information capturing devices 11a and 11b, and the virtual simulation device 12 may be connected by a network system. After simulation conferencing scenes are computed, the virtual simulation device 12 transmits the simulation conferencing scenes having differing visual and audio angles to the wearable information devices 10a and 10b, respectively. In other words, user A of the wearable information device 10a shares the same images and audio sounds as if he/she is facing and interacting with user B at the same geographic location and vice versa.

Also, the environmental information capturing devices 11a and 11b are capable of capturing documentary data inputted by user A and user B respectively, user A can display all relevant data by means of E-mails or other forms of communication in the simulation conferencing scenes to share with user B, and vice versa.

Although the figures of the present invention illustrate only one environmental information capturing device employed in conjunction with one wearable information device, note that the environmental information capturing device may also be used in cooperation with a plurality of wearable information device as required in actual implementations. For example, the environmental information capturing device 11a may be configured to include another user wearing the wearable information device. When an additional user wishes to join with user A and user B in the simulation conferencing scenes, the virtual simulation device 12 may respectively display and provide relevant approval selection items to either user A or B wearing the wearable information devices 10a and 10b for input of user commands which allows another user to participate in the scene. After the other user has joined in the simulated conferencing scene, user A wearing the wearable information device 10a will experience the same simulation conferencing scenes as user B wearing the wearable information device 10b as well as the other added user, and vice versa.

In summary, the virtual conferencing system according to the present invention employs the collaborative operation of plural environmental information capturing device and plural virtual simulation device which enables the virtual simulation device of the cloud configuration to acquire virtual conferencing scenes by an intelligence algorithm and that in turn allows the wearable information device to provide respective users with sensory experiences in virtual conferencing scenes and also avoid delays caused by defects as encountered in conventional techniques.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A simulation conferencing system, including
a wearable information device to be worn by a user;
an environmental information capturing device that captures environmental information; and comprises a direct projector that captures an image of an object and provides the image to a virtual simulation device, to be transmitted to the wearable information device; and
the virtual simulation device that receives the environmental information captured by the environmental information capturing device, calculates simulation conferencing scenes by an intelligence algorithm, and transmits the simulation conferencing scene to the wearable information device as the user's feedbacks.

2. The simulation conferencing system as claimed in claim 1, wherein the wearable information device further includes an optical display unit or an audio source broadcasting unit.

3. The simulation conferencing system as claimed in claim 2, wherein the optical display unit displays the simulation conferencing scenes received by the wearable information device in a full-angle mode or a partial-angle mode.

4. The simulation conferencing system as claimed in claim 1, wherein the environmental information capturing device further comprises an image-capturing unit, an audio source capturing unit, a posture capturing unit, a command capturing unit or a documentary data capturing unit.

5. The simulation conferencing system as claimed in claim 4, wherein the posture capturing unit is a somatosensory device that senses a posture of the user and generates and transmits user posture information to the virtual simulation device such that the virtual simulation device provides the virtual conferencing scenes to the wearable information device accordingly.

6. The simulation conferencing system as claimed in claim 4, wherein the documentary data capturing unit is connected to a PC, a laptop computer, a tablet computer or a smart phone to capture documentary data inputted by the user.

7. The simulation conferencing system as claimed in claim 1, wherein the virtual simulation device is a cloud server.

8. The simulation conferencing system as claimed in claim 1, wherein the wearable information device, the environmental information capturing device, and the virtual simulation device are connected by a network system.

* * * * *